United States Patent
Li (10) Patent No.: US 11,137,972 B2
(45) Date of Patent: Oct. 5, 2021

(54) DEVICE, METHOD AND SYSTEM FOR USING BRAINWAVE INFORMATION TO CONTROL SOUND PLAY

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 528 days.

(21) Appl. No.: 16/086,618

(22) PCT Filed: Jan. 30, 2018

(86) PCT No.: PCT/CN2018/074516
§ 371 (c)(1),
(2) Date: Sep. 20, 2018

(87) PCT Pub. No.: WO2019/000938
PCT Pub. Date: Jan. 3, 2019

(65) Prior Publication Data
US 2021/0182014 A1 Jun. 17, 2021

(30) Foreign Application Priority Data
Jun. 29, 2017 (CN) .......................... 201710516372.3

(51) Int. Cl.
*G06F 3/16* (2006.01)
*G06F 3/01* (2006.01)

(52) U.S. Cl.
CPC .............. *G06F 3/165* (2013.01); *G06F 3/015* (2013.01)

(58) Field of Classification Search
CPC ......... A61B 5/375; A61B 5/486; A61B 5/369; G06F 3/015; G06F 3/165; G06F 3/167
See application file for complete search history.

(56) References Cited

U.S. PATENT DOCUMENTS

2004/0208324 A1* 10/2004 Cheung .................. H04M 1/19
381/77
2006/0044419 A1* 3/2006 Ozawa ..................... H04S 7/30
348/231.99
(Continued)

FOREIGN PATENT DOCUMENTS

CN         2872546 Y       2/2007
CN       102749990 A      10/2012
(Continued)

OTHER PUBLICATIONS

First Office Action for Chinese Patent Application No. 201710516372.3 dated Mar. 5, 2019.
(Continued)

*Primary Examiner* — Eric J Yoon
(74) *Attorney, Agent, or Firm* — Calfee, Halter & Griswold LLP (57) ABSTRACT

This disclosure relates to a device and a method for controlling sound play, and a system associated therewith. The device includes a brainwave detector, a selector and a switcher. The brainwave detector is arranged to detect brainwave information of a user. The selector is arranged to select a sound player to be used from a first sound player and a second sound player based on the brainwave information. The switcher is arranged to send a switch control signal according to a result of the selection so as to cause the selected sound players to play the sound. By selectively switching on a sound player based on the brainwave information of the user, the sound play mode adapts to personal state or expectation of the user.

11 Claims, 4 Drawing Sheets

(56) References Cited

U.S. PATENT DOCUMENTS

| | | | |
|---|---|---|---|
| 2007/0183618 A1* | 8/2007 | Ishii | H04R 3/12 |
| | | | 381/387 |
| 2012/0257035 A1 | 10/2012 | Larsen | |
| 2013/0184552 A1* | 7/2013 | Westermann | A61B 5/6817 |
| | | | 600/378 |
| 2014/0347272 A1 | 11/2014 | Paek et al. | |
| 2017/0359650 A1* | 12/2017 | Wexler | G06F 3/012 |
| 2018/0107274 A1 | 4/2018 | Li | |
| 2018/0196511 A1* | 7/2018 | Chae | A61B 5/16 |

FOREIGN PATENT DOCUMENTS

| | | |
|---|---|---|
| CN | 202759572 U | 2/2013 |
| CN | 104092833 A | 10/2014 |
| CN | 104376855 A | 2/2015 |
| CN | 105339867 A | 2/2016 |
| CN | 205069115 U | 3/2016 |
| CN | 105528084 A | 4/2016 |
| CN | 105681965 A | 6/2016 |
| CN | 206117997 U | 4/2017 |
| CN | 107105369 A | 8/2017 |
| JP | 2005352151 A | 12/2005 |
| KR | 20110089110 A | 8/2011 |

OTHER PUBLICATIONS

Search Report and Written Opinion for International Application No. PCT/CN2018/074516 dated Apr. 18, 2018.

* cited by examiner

DEVICE, METHOD AND SYSTEM FOR USING BRAINWAVE INFORMATION TO CONTROL SOUND PLAY

RELATED APPLICATIONS

The present application is the U.S. national phase entry of PCT/CN2018/074516, with an international filing date of Jan. 30, 2018, which claims the benefit of Chinese Patent Application No. 201710516372.3 filed on Jun. 29, 2017, the entire disclosures of which are incorporated herein by reference.

FIELD

This disclosure relates to the field of sound play, and in particular to a device and method for controlling sound play and a system associated therewith.

BACKGROUND

In an era of complicated and complex information, devices that use speakers for sound propagation are everywhere. Sound emitted by a speaker has a wide propagation range, and the volume of the sound is relatively high and then is suitable for being shared by many users. It is commonly used for e.g., car horns, various broadcasting equipment, music playback devices for square dance etc. However, some people within the sound propagation range might be not interested in these sounds and regard them as sound pollution. A directional sounder can transmit sound waves directionally to some or part of users in a certain environment, which solves the problem of sound pollution. However, the directional sounder has problems such as a relatively narrow propagation range of the sound, etc.

Therefore, selecting an appropriate manner for playing sound is a technical problem that has to be solved urgently.

SUMMARY

Embodiments of this disclosure provide a device, a method and a related system for controlling sound play.

In an aspect, an embodiment of this disclosure relates to a device for controlling sound play. The device comprises a brainwave detector, a selector and a switcher. The brainwave detector is arranged to detect brainwave information of a user. The selector is arranged to select a sound player to be used from a first sound player and a second sound player based on the brainwave information. The switcher is arranged to send a switch control signal according to a result of the selection to cause the selected sound players to play the sound.

In some embodiments, the first sound player is a speaker, and the second sound player is a directional sounder.

In some embodiments, the brainwave detector is configured to generate reference brainwave information for selecting the first and the second sound players by learning a user's thought pattern for selection of a particular sound player. The selector selects the sound player to be used based on the detected brainwave information and the reference brainwave information.

In some embodiments, the selector further comprises a brainwave analyzer. The brainwave analyzer is configured to analyze the brainwave information to extract a brainwave characteristic. The selector selects the sound player to be used based on the extracted brainwave characteristic.

In some embodiments, the brainwave characteristic indicates levels of activity of left and right hemispheres of a user's brain. The selector selects the sound player to be used based on associations established between the levels of activity and the sound players.

In some embodiments, the brainwave characteristic is a frequency characteristic of the brainwave. The selector selects the sound player to be used based on a mental state of the user that corresponds to the frequency characteristic.

In some embodiments, the brainwave analyzer is configured to analyze brainwave information from a plurality of users to determine states of the plurality of users, and select the sound player to be used based on the states of the plurality of users.

In some embodiments, the directional sounder is rotatable. The selector further comprises a brainwave analyzer which is configured to reconstruct a picture being viewed by the user based on the brainwave information and determine a position viewed by the user based on the reconstructed picture in case that the directional sounder is selected to play the sound. The switcher is configured to signal the directional sounder of the position and the switch control signal simultaneously, so as to cause the directional sounder to rotate to generate sound towards the position viewed by the user.

In some embodiments, the picture being viewed by the user is an image displayed in a display device. The brainwave analyzer is configured to determine the display device being viewed by the user based on the reconstructed picture. The switcher is configured to send the position of the display device to the directional sounder, so as to cause the directional sounder to rotate to generate sound towards the position of the display device.

In another aspect, an embodiment of this disclosure relates to a system for playing sound. The system comprises: a first sound player; a second sound player; and a device for controlling sound play as stated above.

In some embodiments, the system further comprises a display device. The first sound player is a speaker, and the second sound player is a directional sounder. The speaker is arranged on a frame of the display device; and the directional sounder is arranged at four corner positions of the frame of the display device.

In some embodiments, there is a plurality of display devices. The directional sounder is positioned separately from the plurality of display devices and is rotatable. The device for controlling sound play comprises a plurality of switchers. Each switcher is arranged on a corresponding one of the plurality of display devices and is configured to, when receiving a result of selection from the selector that the directional sounder is selected, send the position information of the display device to the directional sounder together with the switch control signal, so as to cause the directional sounder to rotate to generate sound towards the position of the display device.

In a further aspect, an embodiment of this disclosure relates to a method for controlling sound play. The method comprises the steps of: obtaining detected brainwave information of a user; selecting a sound player to be used from a first sound player and a second sound player based on the brainwave information; and sending a switch control signal according to a result of the selection to cause the selected sound player to play the sound.

In some embodiments, the selecting comprises: generating reference brainwave information for selecting the first and the second sound player by learning the user's thought pattern for selection of a particular sound player, and selecting the sound player to be used based on the detected brainwave information and the reference brainwave information.

In some embodiments, the brainwave information is analyzed to extract a brainwave characteristic. The selecting comprises: selecting the sound player to be used based on the extracted brainwave characteristic.

In some embodiments, the brainwave characteristic indicates levels of activity of left and right hemispheres of the brain. The selecting comprises: selecting the sound player to be used based on associations established between the levels of activity and the sound player.

In some embodiments, the brainwave characteristic is a frequency characteristic of the brainwave. The selecting comprises: selecting the sound player to be used based on a mental state of the user that corresponds to the frequency characteristic.

In some embodiments, brainwave information from a plurality of users is analyzed to determine the states of the plurality of users. The selecting comprises: performing the selection based on the states of the plurality of users.

In some embodiments, the directional sounder is rotatable. When the directional sounder is selected to play the sound, the method further comprises: analyzing the brainwave information to reconstruct a picture being viewed by the user; determining a position viewed by the user based on the reconstructed picture, and signaling the directional sounder of the position, so as to cause the directional sounder to rotate to generate sound towards the position viewed by the user.

In some embodiments, the picture being viewed by the user is an image displayed in a display device. The step of determining a position viewed by the user based on the reconstructed picture comprises: determining a display device viewed by the user based on the reconstructed picture and enabling the directional sounder to rotate to generate sound towards the position of the display device.

DETAILED DESCRIPTION

In order to enable the skilled in the art to understand the technical solutions of this disclosure better, this disclosure will be described in more details in conjunction with the drawings and the embodiments below.

Figure 1:
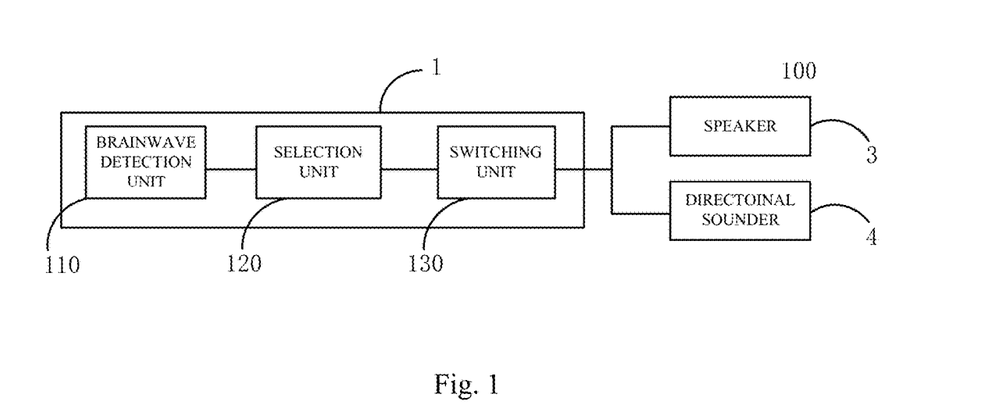
FIG. 1 is a schematic diagram of an exemplary system in accordance with an embodiment of the present disclosure.

FIG. 1 shows an exemplary system 100 provided according to an embodiment of the disclosure. This exemplary system comprises two or more sound players for playing sound, and a sound play control device 1 for controlling which of the sound players is employed to play the sound.

In some embodiments, the sound play control device 1 may be in a form of a headset device, including but not limited to a helmet, a headband, a headphone, etc.

The sound players may have different types. As illustrated in FIG. 1, a sound player may comprise a speaker 3 and a directional sounder 4. The range of sound produced by the speaker 3 is a spatial range of wide area, and the range of sound produced by the directional sounder 4 is a spatial range of narrow area with respect to the speaker 3, which directional sounder sounds towards a particular direction. In some embodiments, the sound player may further comprise an earphone.

Exemplarily, the directional sounder 4 may comprise: an amplifier and an ultrasonic generator. The amplifier is arranged to apply a voltage to the ultrasonic generator under control of a switch control signal from the device 1, so as to enable the ultrasonic generator to emit an ultrasonic signal that is generated via modulation of a conventional audio signal.

Figure 2:
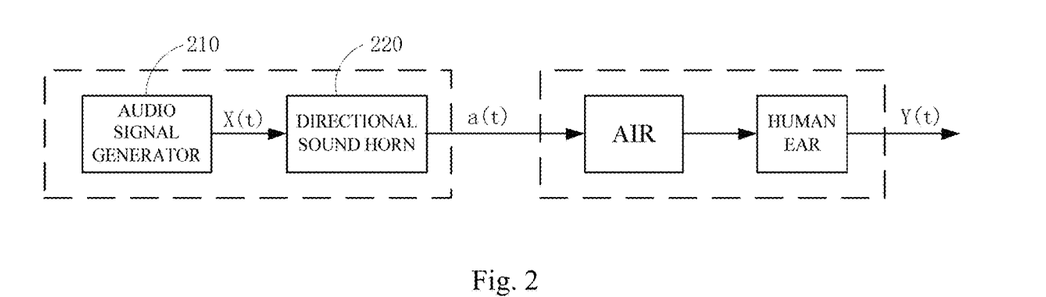
FIG. 2 is a schematic diagram of working principle of a directional sounder.

FIG. 2 shows a schematic diagram of working principle of a directional sounder, in which the ultrasonic generator including an audio signal generator 210 and a directional sound horn 220 is taken as an example for explanation. In the left half part of FIG. 2, the audio signal generator 210 sends a conventional audio signal X(t). The audio signal X(t) passes through the directional sound horn 220, and a modulated signal, i.e., an ultrasonic signal a(t), is obtained after the audio signal is modulated onto the ultrasonic carrier. The directional sound horn 220 achieves directional sound by utilizing the high directivity of the ultrasonic signal. In the right half part of FIG. 2, as the propagation of sound in air and human skin and bones may be regarded as passing through a non-linear system, a new frequency will occur after the modulated signal passes through the non-linear system. The human ear is equivalent to a filter that may only receive a frequency in a range of 20 Hz to 20 KHz, thus a sound Y(t) will be heard again.

Returning to FIG. 1, the device 1 may comprise a brainwave detection unit 110, a player selection unit 120 and a switching unit 130.

The brainwave detection unit 110 is arranged to detect brainwave information of a user. Exemplarily, the brainwave detection unit 110 may generate brainwave information based on a collected electroencephalogram (EEG) signal. The EEG signal is a physiological signal, hence, the brainwave information may objectively reflect different aspects of the user, including but not limited to the state of the brain, the emotional characteristics, mind, etc. In some embodiments, the brainwave information may even be used to reconstruct a picture viewed by the user.

The player selection unit 120 is arranged to select and indicate which of the sound players is to be used based on the detected brainwave information. The switching unit 130 is arranged to send a switch control signal according to the indication of the player selection unit 120 to cause the selected sound player to play the sound, for instance, initiating or switching to the selected sound player to play the sound. Exemplarily, the switching unit 130 may control the selected sound player, e.g., one of the speaker 3 and the directional sounder 4, to start work.

In some embodiments, the brainwave detection unit 110 may be arranged to generate respective reference brainwave modes by learning the user's particular thought patterns for selection of a certain sound player. For example, the brainwave detection unit 110 may generate a first reference brainwave mode corresponding to the first sound player by collecting the user's EEG signal when he/she selects the first sound player, and similarly, generate a second reference brainwave mode corresponding to the second sound player. As such, the player selection unit 120 may comprise a storage 121 for storing the generated reference brainwave modes in association with identifiers of the first and second sound players. The player selection unit 120 may make the decision of selecting the first or the second sound player based on the detected brainwave information and the reference brainwave modes. For example, when answering a phone, the user may initially answer through the earphone. Then, when it is desired to share the content of the phone with the person nearby, the user may have the sound playing be switched to play by the speaker through mind-control, and vice versa.

In this way, the sound players may be switched quickly in response to the user's mind, which allows selection of playing modes to be more convenient, which allows the selection operation to be more user-friendly, especially for people suffering from activity limitation.

In some embodiments, the player selection unit 120 may adapt selection of sound players to various states of the user conveyed by his/her brainwave information, including but not limited to the brain state, the emotional state, the mind state, etc. In these embodiments, the player selection unit 120 may comprise a brainwave analysis unit. The brainwave analysis unit 122 is arranged to receive the brainwave information detected by the brainwave detection unit 110 and analyze the brainwave information so as to extract brainwave characteristics.

In some embodiments, the extracted brainwave characteristics may be frequency characteristics in the wave band of the brainwave. The brainwave analysis unit may determine a corresponding mental state of the user, e.g. stress state or relaxed state or contemplation state or sleep state, based on frequency characteristics in a respective wave band, e.g., $\beta$ wave, $\alpha$ wave, $\theta$ wave, $\delta$ wave, etc. In this way, the player selection unit 120 may select a sound player according to the user's mental state. For example, when the user is in the stress state, since it is hard for the user to concentrate, the directional sounder 4 may be selected at this point to transmit clear and clean sound to the user, so as to reduce feeling of fatigue thereof. On the contrary, when the user is in the relaxed state, the speaker 3 may be selected at this point because his brain is sober and relaxed.

It will be appreciated that the association between a user's mental state and selection of sound players described above is exemplary, other player selection modes suitable for user's mental states may also be designed based on different scenes and/or user preferences.

Some studies have found that the EEG in the cerebral hemisphere responds differently to positive and negative emotions. The EEG activity in the left hemisphere of the brain increases under positive emotions, while the EEG activity in the right hemisphere of the brain increases under negative emotions. In some embodiments, the brainwave detection unit 110 is configured to collect signals of different brain positions. The brainwave analysis unit may analyze these signals respectively so as to determine levels of activity in different brain positions. The player selection unit 120 may select the sound player to be used according to the levels of activity obtained by the analysis. For example, if the detected signal indicates that the right half of the brain is more active, showing that the user may be in a negative emotion at present, then it might be desirable to switch on the directional function to let the user hear a pure sound. At this time, the player selection unit 120 signals the switching unit 130 of a selection result to control the selected sound player, e.g., the directional sounder 4, to switch on, meanwhile the speaker 3 is switched off to avoid sound pollution. If the signal detected by the brainwave detection unit 110 indicates that the left half of the brain is active, showing that the user might be in a positive emotion at present, then the speaker 3 may be switched on. At this point, the player selection unit 120 signals the switching unit 130 of the selection result to control, for example, the speaker 3 to switch on, meanwhile the directional sounder 4 is switched off, so as to realize sound sharing.

It will be appreciated that the association between the levels of activity in brain positions and the selection of sound players described above is exemplary, other player selection modes adapted to levels of activity in user's brain positions may also be designed based on different scenes and/or user preferences.

In some embodiments, the brainwave analysis unit may analyze brainwave information from a plurality of users so as to determine the states of the plurality of users, and select the sound player to be used based on the states of the plurality of users. Exemplarily, in a scene of, e.g. a quadruple private car, four directional sounders may be installed on the roof of the car. Initially, a speaker in the car may be employed to play sound so as for sharing by four users. When the brainwave information from one of the users indicates that he/she has entered a sleep state, the player selection unit 120 may instead select directional sounder(s) to play sound to avoid sound interference to the sleeping user.

It will be appreciated that the association between the multi-user states and the selection of sound players described above is exemplary, other player selection modes suitable for multi-user occasions may also be designed based on different scenes and/or user preferences.

Exemplarily, when the user's brainwave information detected by the brainwave detection unit 110 represents that the directional sounder 4 needs to be switched on, the switching unit 130 will send a corresponding switch control signal based on the selection result signaled by the player selection unit 120. For example, when the directional sounder is switched on under control of the switch control signal, the audio signal is converted into a corresponding voltage signal via for example a digital to analog converter. After being amplified by the amplifier, the voltage signal is transmitted onto a metal polymer film of an ultrasonic generator to enable the metal polymer film to vibrate at a frequency of 6 WHz or higher, thereby generating an ultrasonic signal.

According to the embodiment of this disclosure, since the device for controlling sound play switches on the sound player selectively based on the user's brainwave information, the sound play mode is adapted to user's personal expectation, so that the purpose of reducing the sound pollution is achieved, and switching between sound players is also more convenient.

Figure 3:
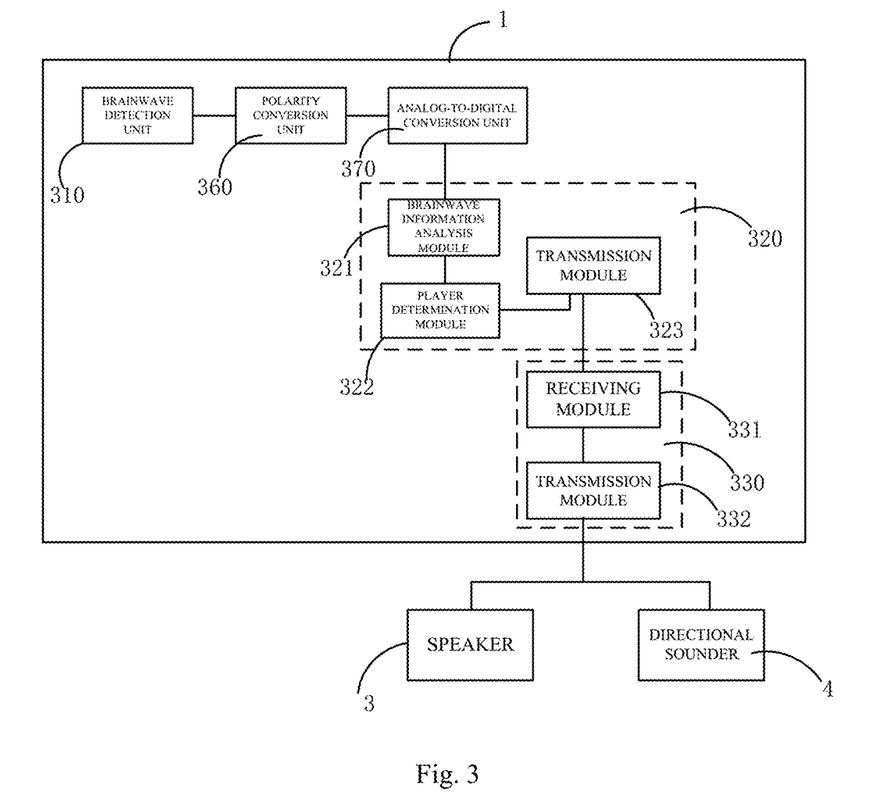
FIG. 3 is a schematic diagram of another exemplary system in accordance with an embodiment of the present disclosure.

FIG. 3 shows another exemplary system according to an embodiment of this disclosure. The system comprises a first sound player 3, a second sound player 4 and a sound play control device 1 according to an embodiment of this disclosure. As shown in FIG. 3, the sound play control device 1 comprises a brainwave detection unit 310, a player selection unit 320 and a switching unit 330. The sound play control device 1 may further comprise a polarity conversion unit 360 and an analog-to-digital conversion unit 370.

The polarity conversion unit 360 is arranged to perform polar conversion on brainwave information detected by the brainwave detection unit 310. The analog-to-digital conversion unit 370 is arranged to convert the brainwave information converted by the polarity conversion unit 360 into a digital signal.

The player selection unit 320 receives the digital signal from the analog-to-digital conversion unit 370 and selects a sound player based on the digital signal. In some embodiments, the player selection unit 320 may comprise a brainwave information analysis module 321 and a player determination module 322. The brainwave information analysis module 321 is arranged to analyze the received digital signal so as to extract a brainwave characteristic. The player determination module 322 determines the sound player to be used based on the extracted brainwave characteristic.

In some embodiments, the player selection unit 320 and the switching unit 330 are positioned separately. In such a scene, the player selection unit 320 may further comprise a transmission module 323 for signaling the switching unit 330 of the determined sound player. For example, the player selection unit 320 may send the identifier of the determined sound player to the switching unit 330.

The switching unit 330 sends a switch control signal to the determined sound player according to signaling of the player selection unit 320. In some embodiments, the switching unit 330 comprises a receiving module 331 for receiving a selection signal from the selection unit, and enabling one of the speaker 3 and the directional sounder 4 to start work based on the selection signal. In some embodiments, the switching unit 330 may further comprise a transmission module 332 for transmitting the switch control signal to the sound player via wireless communication.

Figure 4:
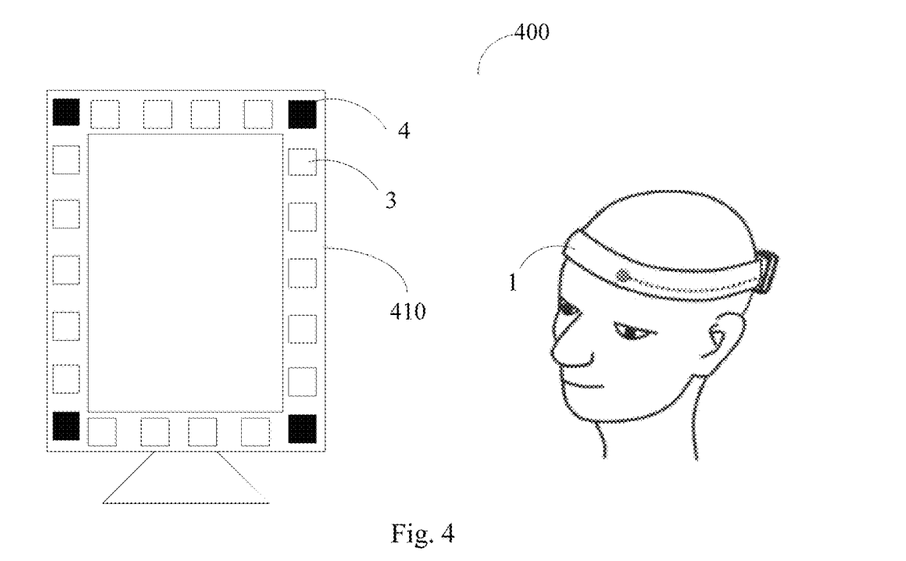
FIG. 4 is a schematic diagram of a further exemplary system in accordance with an embodiment of the present disclosure.

FIG. 4 shows a further exemplary system 400 according to an embodiment of this disclosure. As shown in FIG. 4, the system 400 comprises a sound play control device 1 as well as a speaker 3 and a directional sounder 4. The system further comprises a display device 410. The display device 410 has a frame, and the speaker 3 and the directional sounder 4 are arranged on the frame. Exemplarily, the speaker is arranged on the frame of the display device uniformly to allow the display device to sound uniformly when playing sound. In some embodiments, the number of the directional sounders 4 is smaller than the number of the speakers 3. Exemplarily, the directional sounders 4 are only arranged at four corners of the frame of the display device, in order to prevent the directional sounders 4 from interplaying on respective frequencies of sounding due to being placed too close.

The display device 410 may be a liquid crystal display device or an electroluminescent display device, such as a liquid crystal panel, electronic paper, a mobile phone, a panel computer, a television, a display, a notebook PC, a digital photo frame, a navigator, or any products or components with a display function.

In an exemplary embodiment, the display device 410 may be arranged to exhibit cultural relics in museums, paintings in art galleries or exhibits in exhibition halls. The speaker 3 and the directional sounder 4 are arranged to play corresponding introductions or explanations. In one example, initially, the speaker 3 may be arranged to play the sound. When the sound play control device 1 changes to select the directional sounder 4 to play the sound according to detection of the brainwave information of the user, it sends a switch control signal that instructs to switch sound playing from via the speaker 3 to via the directional sounder 4.

It will be appreciated that although the sound play control device 1 in FIG. 4 is illustrated as a headband, it may also be in any other suitable forms, including but not limited to helmet, headphone, and the like.

Since the system in the embodiment of this disclosure comprises the above device for control sound play, the system of this embodiment may control propagation of sound in a spatial range of wide area or a spatial range of narrow area, thereby reducing the phenomenon of sound pollution, and meanwhile enhancing applicability of the sound playing.

In some embodiments, the directional sounder is rotatable. For example, the directional sounder may have a rotating device itself or be arranged on a rotating device, and thus it may rotate with the rotating device so as to generate sound towards different directions. In this way, the sound propagation range of the directional sounder may be enlarged.

In some embodiments, the sound play control device may further determine a position viewed by a user based on the brainwave information of the user detected by the brainwave detection unit. The position information is sent to the rotating device so that the rotating device rotates correspondingly and then enables the directional sounder to generate sound towards the position viewed by the user. Exemplarily, the sound play control device is configured to reconstruct a picture viewed by the user based on the brainwave information, and determine the position viewed by the user based on the reconstructed picture. Exemplarily, there are different items at respective positions viewed by the user. The content broadcasted by the directional sounder may be correlated with its rotating angle in advance. For different rotating angles, the contents broadcasted by the directional sounder are different, in order to match with its sound playing direction, e.g., the item at the position viewed by the user.

By introducing different contents for respective items (e.g., the exhibited pictures or exhibits) at different positions using one sound directional device, the cost is reduced and the user experience is improved.

Figure 5:
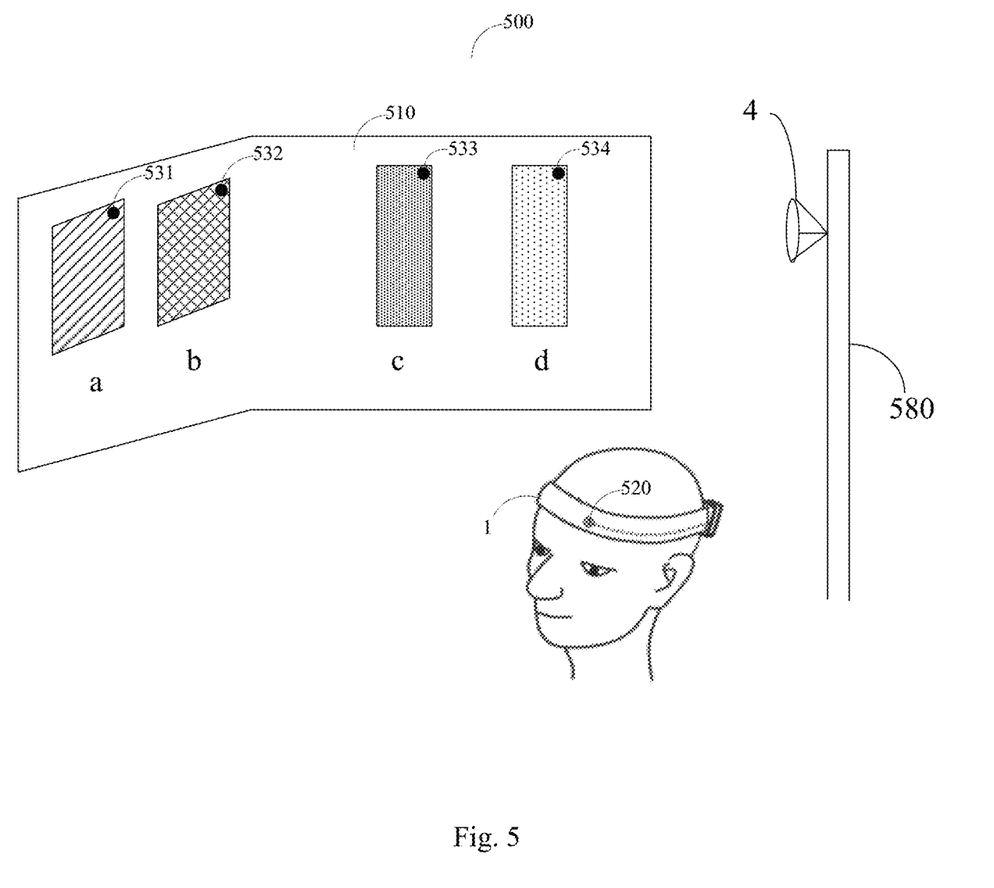
FIG. 5 is a schematic diagram of yet another exemplary system in accordance with an embodiment of the present disclosure.

FIG. 5 schematically shows yet another exemplary system 500 comprising a rotating device according to an embodiment of this disclosure. Similar to FIG. 4, the system 500 comprises a display system 510. It differs from FIG. 4 in that the display system 510 comprises a plurality of display devices, and the plurality of display devices are positioned separately from the directional sounder.

As shown in FIG. 5, the display system 510 comprises display devices a, b, c, d arranged at different positions, wherein each display device may be arranged to display different picture information, such as exhibited paintings, murals, exhibits, commodities etc. The system 500 comprises a sound play control device 1, a rotating device 580 and a directional sounder 4, wherein the directional sounder 4 may generate sound towards different directions (for example, sounding towards the positions where the display devices a, b, c, d locate) by leveraging the rotating device 580.

In some embodiments, when a user is viewing a picture displayed on display device a in the position of display device a, the sound play control device 1 may detect the brainwave information of the user, and reconstruct the picture that the user is viewing based on the detected brainwave information. When it is determined that the display device viewed by the user is display device a after comparing the reconstructed picture with pictures currently displaying on the display devices in the environment where the system 500 locates, the sound play control device 1 may send the position information of display device a (e.g., the identifier of the display device a) to the rotating device 580. The rotating device 580 drives the directional sounder 4 to rotate to enable the directional sounder 4 to generate sound, for example playing the explanation of the content displayed on display device a, towards it. Similarly, when the sound play control device 1 determines that the display device viewed by the user is display device b, c or d based on the detected brainwave information of the user, the rotating device may be controlled to rotate in the above manner so as to enable the directional sounder 4 to generate sound (e.g., playing back the explanation of the content displayed by the display device) towards the corresponding display device.

Alternatively, in some embodiments, the system 500 may also pre-store in a storage unit the position of each of display devices in the environment where it locates. The rotating device may rotate to the position of each display device pre-stored in the storage unit successively according to a preset rotating interval, to make the play cycle through the display devices a, b, c, d automatically.

Alternatively or additionally, the system 500 may further comprise a human eye tracking unit for determining the position of the display device being viewed by a user by tracking gazing direction of human eye. Similarly, the system 500 may further comprise an infrared sensor and the like to determine the position of the display device viewed by the user.

In some embodiments, the sound play control device 1 may comprise a plurality of switching units 531, 532, 533, 534. Each switching unit is arranged on a corresponding display device (e.g., display device a, b, c, d) and is configured to, when receiving an indication from the selection unit 520 for selecting the directional sounder, send the position information of its corresponding display device to the rotating device 580 along with the switch control signal, so as to enable the directional sounder 4 to generate sound towards the position of the display device through rotation of the rotating device 580.

Since the system in this embodiment comprise the above device for controlling sound play, the display system of this embodiment may control propagation of sound in a spatial range of wide area or a spatial range of narrow area, thereby reducing the phenomenon of sound pollution, and meanwhile enhancing applicability of sound playing. Moreover, the system in this embodiment employs one directional sounder to generate sound to a plurality of display devices directionally through rotation of the rotating device, hence, the power consumption may be reduced.

Figure 6:
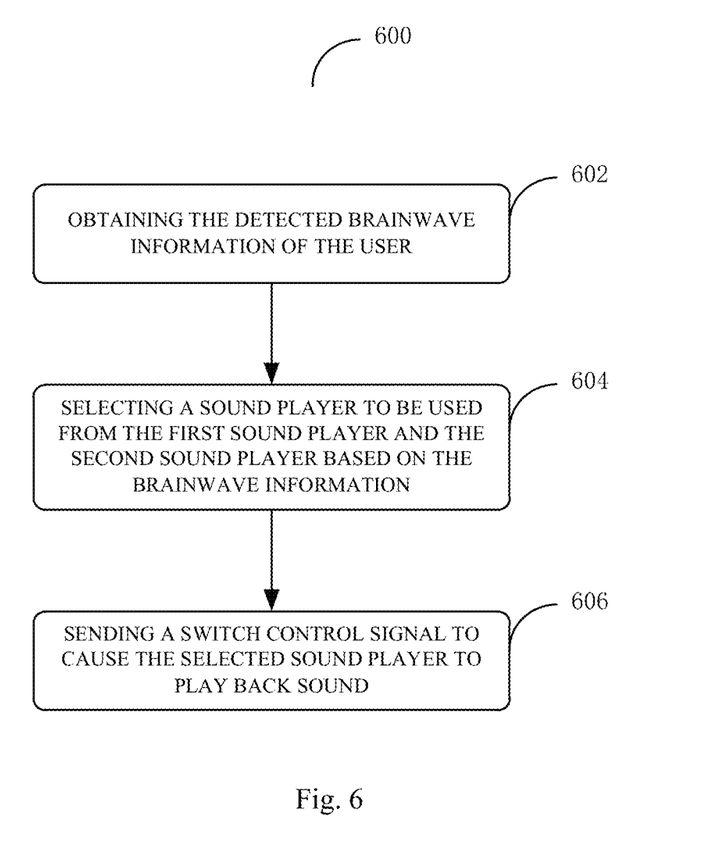
FIG. 6 is a schematic flow chart of a method in accordance with an embodiment of the present disclosure.

FIG. 6 shows a method 600 for controlling sound play according to an embodiment of this disclosure. The method 600 may be carried out by the sound play control device and the sound play system according to the embodiments of this disclosure.

At step 602, the detected brainwave information of a user is obtained. A brainwave detection unit may be used to collect the brainwave signal and process it to obtain the brainwave information.

At step 604, a sound player to be used is selected from a first sound player and a second sound player based on the brainwave information. The first and second sound players may be different types of sound players. The brainwave information may reflect different aspects of the user, such as the brain state, the emotional characteristic or mind etc. In some scenarios, the brainwave information may be used for reconstructing the picture being viewed by the user.

In some embodiments, the brainwave information may be analyzed so as to extract brainwave characteristics that may characterize different aspects of the user, such that an optimal sound player being optimally adapted to the user may be selected based on the extracted brainwave characteristics. In one embodiment, the brainwave characteristic indicates levels of activity of the left and right hemispheres of the brain. Hence, the sound player to be used may be selected based on the association established between the levels of activity and the sound players. In another embodiment, the brainwave characteristic may be a frequency characteristic of the brainwave. Hence, the sound player to be used may be selected based on a metal state of the user that corresponds to the frequency characteristic. In a further embodiment, the brainwave information from a plurality of users may be analyzed to determine the metal states of the plurality of users, and the sound player to be used may be selected based on the metal states of the plurality of users.

In some embodiments, an image that the user is viewing may be reconstructed based on the brainwave information. The reconstructed image is used for determining the position viewed by the user, so as to determine towards which position the directional sounder should generate sound.

There may be a plurality of items in the environment where the user locates; and the scene being viewed may be an item.

At 606, the switch control signal is send according to a result of the selection to cause the selected sound player to play sound. In one embodiment, when the selection result indicates selection of a directional sounder, the position determined based on the image reconstructed by the brainwave information are sent to a rotating device attached to the directional sounder along with the switch control signal simultaneously, so as to enable the rotating device to correspondingly drive the directional sounder to rotate towards this position to generate sound.

The process in FIG. 6 is illustrated as a set of blocks in the logic flow chart. These blocks represent the sequence of operations, some or all of them may be carried out by hardware, software or combination thereof. In the context of the software, these blocks represent computer executable instructions stored on one or more computer readable mediums, when the computer executable instructions are executed by one or more processors, they carry out said operations.

As used herein, the terms such as "unit", "module", "system", "interface" and/or the like are generally intended to refer to computer-related entities, either hardware, a combination of hardware and software, software, or software in execution.

Further, unless specified otherwise, the terms "first", "second" and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B, or two different or two identical objects, or the same object.

In addition, the word "exemplary" is used herein to mean serving as an example, instance, illustration, etc., while being not necessarily beneficial. Moreover, unless specified otherwise or clear from context to be directed to a singular form, the terms "a" and "an" as used in the present disclosure are generally interpreted as indicating "one or more". Furthermore, at least one of A and B and/or the like generally means A or B or both A and B. Besides, for the terms of "comprise", "possess", "have", "with" and/or variants thereof used in the detailed description or the claims, such terms are intended to be inclusive in a similar way as the term "include".

Various aspects of the present disclosure may be used separately, in combination or in various arrangements not discussed specifically in the embodiments described above, therefore, the application thereof is not limited to the details and arrangements of the components expounded in the above description or illustrated in the drawings. For example, some aspects described in one embodiment may be combined with some aspects described in other embodiments in any way.

It will be appreciated that the above embodiments are only exemplary embodiments for explaining the principle of this disclosure, however, this disclosure is not limited to this. The ordinary skilled person in the art, in the case of not departing from the spirit and the essence of this disclosure, may make various modifications and improvements. These modifications and improvements should also be regarded as the protection scope of this disclosure.

The invention claimed is:

1. A device for controlling sound play, comprising:
a brainwave detector for detecting brainwave information of a user;
a selector for selecting a sound player to be used for playing a sound from a first sound player and a second sound player based on the brainwave information, wherein the first sound player is a speaker and the second sound player is a directional sounder, and a spatial range of sound produced by the directional sounder is narrower than a spatial range of sound produced by the speaker; and
a switcher for sending a switch control signal according to a result of the selection to switch on the selected sound player to play the sound;
wherein the selector further comprises a brainwave analyzer which is configured to analyze the brainwave information to extract a brainwave characteristic, and
the selector selects to switch off the speaker and switch on the directional sounder to play the sound in response to the brainwave characteristic indicating that a right hemisphere of a user's brain is more active than a left hemisphere of the user's brain, and to switch off the directional sounder and switch on the speaker to play the sound in response to the brainwave characteristic indicating that the left hemisphere of the user's brain is more active than the right hemisphere of the user's brain.

2. The device according to claim 1, wherein the brainwave detector is configured to generate reference brainwave information for selecting the first and the second sound players by learning a user's thought pattern for selection of a particular sound player, and the selector selects the sound player to be used based on the detected brainwave information and the reference brainwave information.

3. The device according to claim 1, wherein the brainwave characteristic is a frequency characteristic of the brainwave information, and the selector further selects the sound player to be used based on a mental state of the user that corresponds to the frequency characteristic.

4. The device according to claim 1, wherein the brainwave analyzer is further configured to analyze brainwave information from a plurality of users to determine states of the plurality of users and select the sound player to be used based on the states of the plurality of users.

5. A system for playing sound, comprising:
a first sound player;
a second sound player;
a brainwave detector for detecting brainwave information of a user;
a selector for selecting a sound player to be used for playing a sound from the first sound player and the second sound player based on the brainwave information, wherein the first sound player is a speaker and the second sound player is a directional sounder, and a spatial range of sound produced by the directional sounder is narrower than a spatial range of sound produced by the speaker; and
a switcher for sending a switch control signal according to a result of the selection to switch on the selected sound player to play the sound;
wherein the selector further comprises a brainwave analyzer which is configured to analyze the brainwave information to extract a brainwave characteristic, and
the selector selects to switch off the speaker and switch on the directional sounder to play the sound in response to the brainwave characteristic indicating that a right hemisphere of a user's brain is more active than a left hemisphere of the user's brain, and to switch off the directional sounder and switch on the speaker to play the sound in response to the brainwave characteristic indicating that the left hemisphere of the user's brain is more active than the right hemisphere of the user's brain.

6. The system according to claim 5, further comprising a display device, wherein the speaker is arranged on a frame of the display device, and the directional sounder is arranged at four corner positions of the frame of the display device.

7. The system according to claim 5, further comprising a plurality of display devices, and the directional sounder is positioned separately from the plurality of display devices and is rotatable;
the system comprises a plurality of switchers, each of the switchers being arranged on a corresponding one of the plurality of display devices and being configured to, in case of receiving a result of a selection from the selector that the directional sounder is selected, send the position information of the display device to the directional sounder together with the switch control signal, so as to cause the directional sounder to rotate to generate sound towards the position of the display device.

8. A method for controlling sound play, comprising:
obtaining detected brainwave information of a user;
selecting a sound player to be used for playing a sound from a first sound player and a second sound player based on the brainwave information, wherein the first sound player is a speaker and the second sound player is a directional sounder, and a spatial range of sound produced by the directional sounder is narrower than a spatial range of sound produced by the speaker; and
sending a switch control signal according to a result of the selection to switch on the selected sound player to play the sound;
wherein the brainwave information is analyzed to extract a brainwave characteristic, and said selecting comprises selecting to switch off the speaker and switch on the directional sounder to play the sound in response to the brainwave characteristic indicating that a right hemisphere of a user's brain is more active than left hemisphere of the user's brain, and to switch off the directional sounder and switch on the speaker to play the sound in response to the brainwave characteristic indicating that the left hemisphere of the user's brain is more active than the right hemisphere of the user's brain.

9. The method according to claim 8, wherein the selecting comprises:
generating reference brainwave information for selecting the first and the second sound player by learning a user's thought pattern for selection of a particular sound player and selecting the sound player to be used based on the detected brainwave information and the reference brainwave information.

10. The method according to claim 8, wherein the brainwave characteristic is a frequency characteristic of the brainwave information, and the selecting further comprises: selecting the sound player to be used based on a mental state of the user that corresponds to the frequency characteristic.

11. The method according to claim 8, wherein brainwave information from a plurality of users is analyzed to determine the states of the plurality of users, and the selecting further comprises: performing the selection based on the states of the plurality of users.

* * * * *